Oct. 24, 1950     E. A. COLMAN     2,526,636
MOISTURE MEASURING INSTRUMENT
Filed Nov. 14, 1947     2 Sheets-Sheet 2

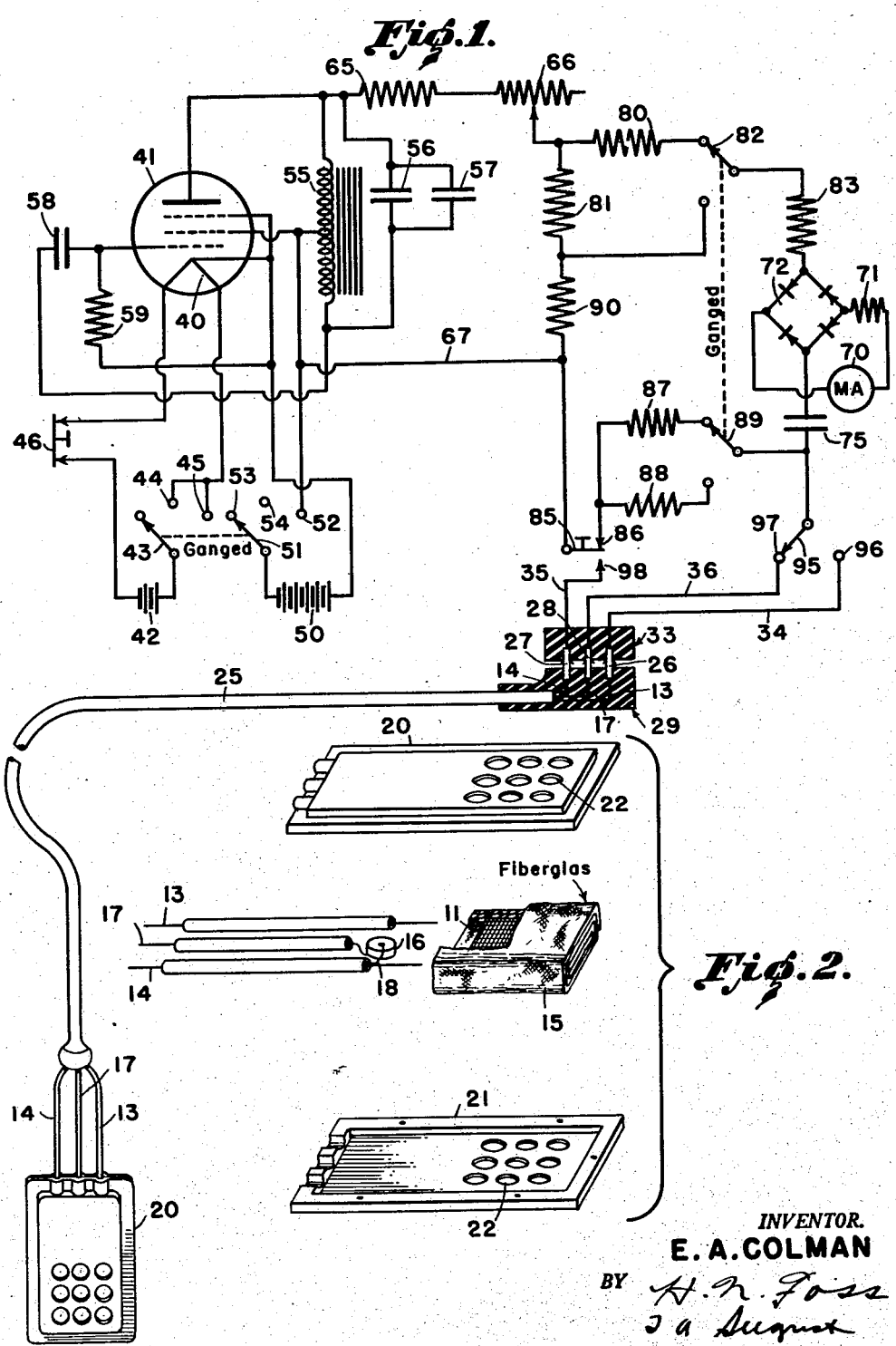

INVENTOR.
E. A. COLMAN
BY
ATTORNEYS

Patented Oct. 24, 1950

2,526,636

UNITED STATES PATENT OFFICE 2,526,636

MOISTURE MEASURING INSTRUMENT

Edward A. Colman, Berkeley, Calif., assignor to the United States of America as represented by the Secretary of Agriculture Application November 14, 1947, Serial No. 786,035

3 Claims. (Cl. 73—73)

(Granted under the act of March 3, 1883, as amended April 30, 1928; 370 O. G. 757)

This application is made under the act of March 3, 1883, as amended by the act of April 30, 1928, and the invention herein described, if patented in any country, may be manufactured and used by or for the Government of the United States of America for governmental purposes throughout the world without the payment to me of any royalty thereon.

This invention relates to an instrument for measuring the moisture content of a porous medium, particularly soil.

Moisture measurements of soil may be made by the usual method of sampling, drying and weighing the sample before and after drying to determine the moisture content. This procedure is laborious, requires disturbance of the soil where the sample is taken, and does not permit of taking instantaneous or continuous reading, as may be desired, since in soil conditions the moisture content varies with time.

Various deviations in soil moisture measuring processes and instruments have been made. One such employs a moisture-sensitive element including a block of a porous material embedded in and exposed to the soil, the moisture content of which increases with increasing moisture content of the soil and the electrical resistance of which decreases with the increasing moisture content, and measurement of the electrical resistance, thereby to obtain readings which, when calibrated with moisture content, determine the moisture content of the soil.

In prior art instruments of this type, the block of porous material, such as fired porous clay or plaster of Paris, has quite small pores, so that the block becomes saturated with water when at equilibrium with quite low moisture content of the soil. This limits the range of the instrument to measurement of only the lower moisture content of soils. A second deficiency of the prior art, especially where plaster of Paris is used as the porous material, results from slow disintegration of the material due to its slight solubility in water. This alters the calibration of the block and eventually results in its destruction for this purpose. A third deficiency results from the low mechanical strength of the porous material. This makes it essential to use quite a large block to give it sufficient strength. As a consequence of the resulting large water-absorbing volume, considerable time is required to bring the block into moisture equilibrium with the soil. This time lag is of disadvantage where it is desired to take readings at short intervals or continuous readings to trace rapid soil moisture changes.

It is the object of the present invention to overcome the deficiencies above mentioned and such other objects as will be apparent from the following description and claims.

According to the present invention, compact woven glass fabric is used as a porous material. I have found that this material may be used in small amounts to separate the electrodes between which the resistance is measured, quickly establishes moisture equilibrium conditions with that of the soil in which it is embedded, maintains constant characteristics over a long period of time, and may be used to measure moisture contents ranging from air dryness to complete saturation.

Preferably, the moisture-sensitive element is constructed of two flat screens as the electrodes, these being separated and also preferably surrounded with at least one layer of woven glass fabric. With such an element, it is also necessary to measure temperature because of a temperature coefficient which also affects the resistance. A heat-sensitive element of known type having two terminals, an element the electrical resistance of which varies sensitively with temperature changes, is used for this purpose. The moisture-sensitive element and heat-sensitive element are mounted together tightly in a metal casing with waterproof electrical lead wires connected to the electrodes and terminals, the construction and arrangement being such that when embedded in the porous medium the glass fabric is exposed to the medium, thus to permit passage of moisture into and out of the fabric. This unit, hereinafter referred to as the "soil unit," may be buried in the soil with the leads running to the surface for connection to an appropriate ohmmeter.

For a detail description of the invention, reference is made to the accompanying drawing, in which—

Figure 1 is a wiring diagram of the ohmmeter showing the soil unit connected thereto;

Figure 2 is an exploded view of the soil unit with parts broken away;

Figure 5:
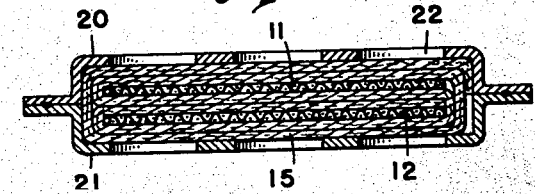
Figure 5 is a section taken on the line 5—5 of Figure 4.

The flat electrodes 11 and 12 are formed of corrosion resistant metal screen (60-mesh), each electrode being about .62 of an inch square. These are laid in contact with the ends of waterproof insulated corrosion resistant lead wires 13 and 14, and are then wrapped in a strip of glass fabric 15, about .8 of an inch wide, .007 of an inch thick, and 5 inches long, in the manner best shown in Figure 5, thus to separate the electrodes and surround them on each side with two layers of the glass fabric. Good results are obtained with glass fabric known as "silica-fibered," which is micro-porous and has been treated chemically to remove most of the salts present in the glass. Better stability and water-retentive characteristics are obtained if the glass fabric is further fired in an electric muffle at about 1080° C. for about 15 hours to close the micro-pores.

Figure 3:
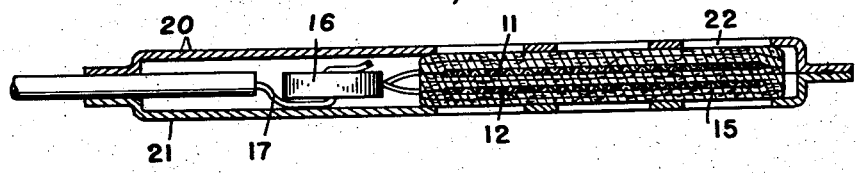
Figure 3 is a section of the soil unit taken on the line 3—3 of Figure 4.
Figure 4:
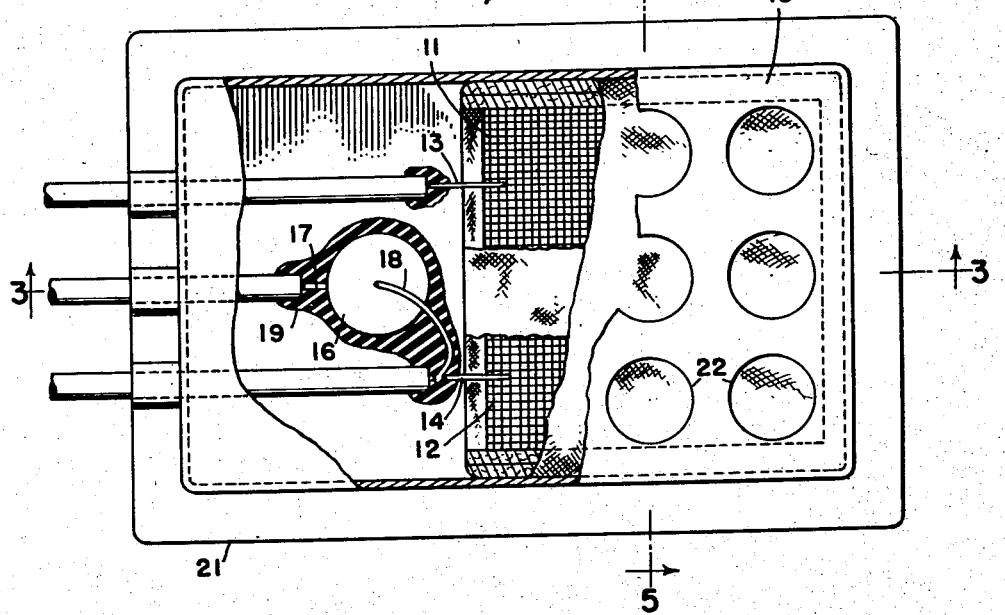
Figure 4 is a plan view of the soil unit with parts broken away.

The heat-sensitive element 16 is of known type and has a resistance of from 460 to 6300 ohms with temperature changes from 110° to 10° F. Connection is made to one terminal of the heat-sensitive element with a lead wire 17, the other terminal thereof being connected with a tail conductor 18 to the common lead wire 14. The heat-sensitive element and connections are waterproofed by enclosing them in a body of thermosetting material 19, as illustrated in Figure 4. The connections between the electrodes and their respective lead wires are also enclosed in such a coating.

The parts are then mounted in a corrosion-resistant metal casing formed of two similar mating halves 20 and 21, spot welded together at the edges as illustrated, the casing having a plurality of apertures as shown at 22 communicating with the glass fabric, thus to permit passage of moisture through the outer layers of glass fabric, the screens forming the electrodes, and into and out of the glass fabric separating the electrodes.

Lead wires 13, 14 and 17 are run through a flexible waterproof cable 25 to terminals 26, 27 and 28 of a three-terminal plug 29 for detachable coupling with mating terminals of the three-terminal socket 33, the terminals of this socket being in turn permanently connected to the conductors 34, 35 and 36 leading to the ohmmeter in such manner that conductor 34 connects to lead wire 13, common conductor 35 to lead wire 14 and conductor 36 to lead wire 17.

In order to avoid polarization of the heat-sensitive element and electrodes of the moisture-sensitive element, with consequent drift in resistances during the taking of measurements, it is necessary to use an alternating current ohmmeter, one having a measuring range of about from 50 to 3,000,000 ohms being satisfactory for use with the soil unit of the dimensions heretofore described.

The alternating current is supplied by an oscillator shown diagrammatically in the upper left-hand part of Figure 1. The filament 40 of the tube 41 (No. 3Q4 or a tube of similar characteristics) is heated with an A-battery 42 connected to the filament through a three-way manually controlled switch 43, contacts 44 and 45 of the switch being connected. Push button, normally closed switch 46 is placed in series with switch 43 and is opened by closing the lid of the cabinet housing the ohmmeter as a safety measure to assure opening of the A-battery circuit when the cabinet is closed in case switch 43 is inadvertently left on.

Plate voltage is supplied by B-battery 50, of about 67½ volts, connected to the tube through a three-way switch 51 ganged to switch 43 in such manner that switch 51 closes the circuit only on contact 52 with contacts 53 and 54 open. With this arrangement, when switch 43 closes the circuit to contact 44, thus closing the A-battery circuit, switch 51 closing the circuit to contact 54 is yet open, so that the tube may be warmed without closing the B-battery circuit. After the warming, switches 43 and 51 may be shifted to contacts 45 and 52, thus closing both the A-battery and B-battery circuits.

Other elements of the oscillator are connected to the tube in the manner illustrated. These include the inductor 55 and by-pass condensers 56 and 57 having ratings of .1 microfarad and .05 microfarad, respectively, which combined give an oscillation frequency of about 90 cycles per second. Feed-back condenser 58 and resistor 59 have ratings of about .002 microfarad and 1.5 megohms.

The alternating current from the oscillator is applied to one side of the meter circuit, shown diagrammatically in the upper right-hand corner of Figure 1, through resistor 65 having a rating of about 2200 ohms and manually operated variable resistor 66 having a maximum resistance of about 10,000 ohms and to the other side of the meter circuit through conductor 67. The purpose of variable resistor 66 is to compensate for variations in the oscillator output voltage which may result from battery changes, and so forth.

The meter circuit is adapted to take readings for both the moisture-sensitive element and the heat-sensitive element. The direct current meter 70 has a rating of 200 microamperes at full scale, a resistor 71 having a rating of approximately 40 ohms being connected in series with the meter. The meter is connected in the circuit through rectifier 72 (selenium full wave) and condenser 75 having a rating of 4 microfarads.

Current is supplied from variable resistor 66 to one side of the rectifier either through resistor 80 having a rating of about 15,000 ohms or through resistor 81 having a rating of about 7500 ohms, depending on the setting of manually operated two-way switch 82, and finally through resistor 83 having a rating of about 250 ohms. Current is supplied from the oscillator to the other side of the rectifier through the conductor 67, through manually operated push button switch 85 which is normally closed to contact 86, either through resistor 87 having a rating of about 7500 ohms or through resistor 88 having a rating of about 50 ohms, depending on the setting of two-way switch 89 which is ganged to switch 82, and through the condenser 75. Resistor 90 having a rating of about 1500 ohms is connected in parallel with the meter and rectifier in the manner shown.

As before mentioned, the common lead wire 14 from both the moisture-sensitive element and the heat-sensitive element connects to the common conductor 35, the other side of the moisture-sensitive element connects through lead wire 13 to the conductor 34, and the other side of the heat-sensitive element connects through the lead wire 17 to the conductor 36. In taking resistance measurements of the moisture-sensitive element, manually operated two-way switch 95 is closed to contact 96, thus to connect the electrodes of the moisture-sensitive element to the ohmmeter, while in taking resistance measurements of the heat-sensitive element, switch 95 is closed to contact 97, thus to connect the terminals of the heat-sensitive element to the ohmmeter. With switch 95 set in the desired position, pressing of switch 85 to open it from contact 86 and close it to contact 98 results in placing either the moisture-sensitive element or the heat-sensitive element in the circuit in place of resistor 87 or resistor 88.

Switches 82 and 89 are set either to throw resistors 80 and 87 or resistors 81 and 88 into the circuit, the former two resistors having the higher resistance values, thus to give the higher reading of the meter. The position of the switches giving the lower meter reading is used in measurements of the resistance of the heat-sensitive element and in measurement of the resistance of the moisture-sensitive element in the range about from 50 to 10,000 ohms, while the position of the switches giving the higher meter reading is used for measurement of the resistance of the moisture-sensitive element above 10,000 ohms.

To calibrate the instrument, a sample of soil is taken from the location in which the soil unit is to be buried. The soil unit is embedded in this sample which is maintained at a fixed reference temperature (60° F. is convenient). The ohmmeter is set by adjusting the variable resistor 66 to bring the meter to full scale reading, with switch 85 set to contact 86. Readings of the meter are then taken with switch 95 set to contact 96 and by closing switch 85 to contact 98, noting of course the setting of switches 82 and 89, with interval variations of the moisture content of the sample from complete air dryness to complete saturation, the actual moisture content of the sample at various meter readings being determined by weighing the moist sample and computing the percentage moisture based on the weight of the oven-dried sample. A calibration chart is then prepared by plotting the moisture contents thus determined against the meter readings and noting on the chart the setting of switches 82 and 89.

Since the resistance between the electrodes of the moisture-sensitive element varies with temperature as well as moisture content, a resistance determination of the element taken at a temperature differing from the reference temperature must be corrected to the value it would have at the reference temperature. The temperature coefficient of such resistance (percentage change in resistance per degree change in temperature) increases as the resistance at the reference temperature increases, that is, increases with decreasing soil moisture content. A satisfactory way to construct a temperature correction chart involves placing a soil unit in each of ten covered jars of soil, wetting each soil to a different moisture content, sealing each jar, and then determining the resistance between the electrodes of the moisture-sensitive elements as the soil in the various jars is subjected to a wide range of temperatures. It is not necessary, of course, to determine actual temperatures, but only the meter readings with switches 82 and 89 set to give the lower meter-reading and with switch 95 closed to contact 97. The data thus obtained may be recorded on temperature correction charts for future reference.

To use the instrument in determining the moisture contents in the field, a calibrated soil unit is buried in the desired location, where it may be left for any length of time. Moisture determinations may be made at a desired time by connecting the ohmmeter to the soil unit, adjusting variable resistor 66 to bring the meter to the full scale reading at which it is calibrated, closing switch 85 to contact 98 for taking meter readings, one reading with the moisture-sensitive element and one with the heat-sensitive element switched in, and determining the soil moisture content by reference to the calibration and temperature correction charts.

Having thus described the invention, what is claimed is:

1. An instrument for measuring the moisture content of a porous medium comprising a unit to be embedded in the medium, said unit having a moisture-sensitive element provided with two flat screen electrodes separated and surrounded by at least one layer of woven glass fabric, and provided with a heat-sensitive element having two terminals the electrical resistance of which varies with temperature change, said moisture-sensitive element and heat-sensitive element having lead wires connected to the electrodes and terminals for connection to an ohmmeter and being tightly enclosed in a casing provided with apertures communicating with the glass fabric thus to permit passage of moisture into and out of the glass fabric.

2. An instrument for measuring the moisture content of a porous medium comprising a unit to be embedded in the medium, said unit having a moisture-sensitive element provided with two flat screen electrodes separated and surrounded by at least one layer of woven glass fabric, and provided with a heat-sensitive element having two terminals the electrical resistance of which varies with temperature change, said moisture-sensitive element and heat-sensitive element being tightly enclosed in a casing provided with apertures communicating with the glass fabric thus to permit passage of moisture into and out of the glass fabric, a lead wire connected to one of the electrodes of the moisture-sensitive element, a separate lead wire connected to one terminal of the heat-sensitive element, and a common lead wire connected to the other electrode and other terminal, said lead wires extending out of the casing for connection to an ohmmeter.

3. The instrument as defined in claim 2 characterized in that the lead wires are connected through a two-way switch to the ohmmeter such that with one setting of the switch the electrodes of the moisture-sensitive element are connected to the ohmmeter and with the other setting thereof the terminals of the heat-sensitive element are connected to the ohmmeter.

EDWARD A. COLMAN.

REFERENCES CITED

The following references are of record in the file of this patent:

UNITED STATES PATENTS

| Number | Name | Date |
|---|---|---|
| 1,749,826 | Lubach | Mar. 11, 1930 |
| 2,047,638 | Kott | July 14, 1936 |
| 2,342,553 | Olpin | Feb. 22, 1944 |
| 2,398,333 | Shoemaker | Apr. 9, 1946 |